(12) United States Patent
Finlayson

(10) Patent No.: US 8,079,154 B1
(45) Date of Patent: Dec. 20, 2011

(54) APPARATUS AND METHOD FOR MEASURING CURVATURE OF TUBES

(75) Inventor: David F. Finlayson, Troy, NY (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1303 days.

(21) Appl. No.: 11/690,879

(22) Filed: Mar. 26, 2007

(51) Int. Cl.
*G01B 5/25* (2006.01)
(52) U.S. Cl. .................. 33/303; 33/365; 33/533
(58) Field of Classification Search .......... 33/302, 33/303, 365, 370, 533
See application file for complete search history.

(56) References Cited

U.S. PATENT DOCUMENTS

| 870,098 | A | * | 11/1907 | Hartshorn | 33/370 |
| 2,241,401 | A | * | 5/1941 | Haskel | 33/533 |
| 4,222,173 | A | * | 9/1980 | Hall | 33/533 |
| 4,916,824 | A | * | 4/1990 | Shimazutsu et al. | 33/533 |
| 5,231,766 | A | * | 8/1993 | Pavlak | 33/533 |
| 5,647,139 | A | * | 7/1997 | Richardson | 33/533 |
| 7,614,662 | B2 | * | 11/2009 | Spanger | 33/370 |
| 2010/0093246 | A1 | * | 4/2010 | Honda et al. | 33/533 |

* cited by examiner

*Primary Examiner* — G. Bradley Bennett
(74) *Attorney, Agent, or Firm* — John F. Moran

(57) ABSTRACT

An apparatus for measuring an angle of inclination of a tangent to a centerline curve of a tube includes a shuttle and a clinometer rotatably fixed to the shuttle. The shuttle comprises a pair of circular end plates and a shaft that joins the end plates. A carrier is attached to the shaft and the clinometer is fixed to the carrier. The shaft is rotatable with respect to the end plates, or the carrier is rotatable with respect to the shaft. The method of determining curvature of a tube having a centerline curve comprises measuring angles of inclination of the tangent to the centerline curve at a plurality of axial locations along the tube.

17 Claims, 1 Drawing Sheet

APPARATUS AND METHOD FOR MEASURING CURVATURE OF TUBES

STATEMENT OF GOVERNMENT INTEREST

The inventions described herein may be manufactured, used and licensed by or for the U.S. Government for U.S. Government purposes.

BACKGROUND OF THE INVENTION

The invention relates in general to munitions and in particular to large gun barrels or tubes.

Due to the unavoidable presence of residual stress in the manufacture of gun barrels, it is virtually impossible to produce a gun barrel that is adequately straight, without post-machining straightening. The process of barrel straightening involves physically altering the residual stress distribution in the barrel by some means, such as bending the barrel beyond the elastic limit of the barrel material in a press. The straightening process requires as input some description of the state of the barrel centerline as manufactured.

A known method first establishes a reference line between the centers of the bore at the breech and muzzle ends of the barrel. The reference line may comprise a taut wire or a laser beam. A target, constrained by the barrel bore so that the target center is collocated with the centerline of the bore, is then moved from station to station (axially) along the tube. By using a telescope to view the target calibration with respect to the reference centerline, a table of offsets of the centerline curve can be created. Based only on the table of offsets and his experience, the operator of the straightening press must produce as straight a tube as possible. The lack of further guidance in this process makes it very much a matter of the operator's skill.

To improve productivity and quality, a more accurate and complete description of the barrel centerline curve is required. Specifically, if the magnitude and the point of application of the corrective bending moment are to be directly calculated rather than estimated by the press operator, then the curvature of the barrel centerline must be precisely known. The curvature of the barrel centerline at stations along the length of the barrel may be obtained using the curvature formula. The curvature formula is solely a function of the first and second derivatives of the centerline curve. Because the centerline curve for a particular barrel is not a known mathematical function, its derivatives must be determined numerically.

In theory, it may be possible to calculate the required derivatives using the offsets of the centerline curve as measured by the known method discussed above. However, the calculation of numerical derivatives is a process that is inherently unstable. That is, unlike numerical integration and, depending on the precision of the measurements used, a decrease in the size of the measurement interval beyond a certain point leads to increased error. Thus, the lack of measurement precision places an absolute limit on the precision of the derivative calculation. Because the measurement of the offsets of the centerline curve by the known method is not very precise, it is problematic, on that basis alone, to base the calculation of the derivatives on such measurements.

Furthermore, because the curvature formula contains second order as well as first order derivatives, an additional source of error exists when using the measured offsets of the centerline curve. The additional error is the accumulating error that occurs with successive numerical operations. There are formulas for calculating higher order derivatives directly, but these formulas are less accurate than the first order derivative formulas. Thus, a need exists for a more accurate method of determining the curvature of a tube.

SUMMARY OF THE INVENTION

It is an object of the invention to provide a method for more accurately describing the centerline curve of a tube than the known methods.

It is another object of the invention to provide an apparatus for measuring the angle of inclination to the horizontal of a tangent to the centerline curve at designated positions along the length of the tube.

One aspect of the invention is an apparatus for measuring an angle of inclination of a tangent to a centerline curve of a tube comprising a shuttle; and a clinometer rotatably fixed to the shuttle. The shuttle may comprise a pair of circular end plates and a shaft that joins the end plates. The shuttle may comprise a carrier attached to the shaft. The clinometer may be fixed to the carrier.

In one embodiment, the shaft is rotatable with respect to the end plates. In another embodiment, the carrier is rotatable with respect to the shaft.

The apparatus may further comprise a computer connected to the clinometer, a line attached to the shuttle and a winch attached to the line.

Another aspect of the invention is a method of determining curvature of a tube having a centerline curve comprising measuring angles of inclination of a tangent to the centerline curve at a plurality of axial locations along the tube. In one embodiment, four angles of inclination of a tangent to the centerline curve are measured at each axial location. Preferably, the four angles of inclination are measured at four tube positions that are about ninety degrees apart.

The four angles of inclination may comprise two pairs of angles of inclination, each pair comprising angles of inclination that are measured at tube locations that are 180 degrees apart. An angle of inclination that is corrected for gravity equals one-half of a difference between the pair of angles of inclination that are measured at tube locations that are 180 degrees apart.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

The inventive method for describing the centerline curve of a tube uses a coordinate system that is fixed relative to the tube. The coordinate system has its origin at the center of the rear face of the tube, has its x-axis directed horizontally, has its y-axis directed vertically and has its z-axis directed perpendicularly to the other axes to define a right-handed coordinate system. The plane defined by the x and z axes is, therefore, horizontal, and is the plane of reference for measuring the angle of inclination of tangents to the centerline curve at a plurality of positions along the length of the tube. The measured angles are used in the calculations of the derivatives required for the calculation of curvature and other descriptors of the centerline curve. The first derivatives are calculated as described herein. The second derivatives may be obtained by numerically differentiation of the first derivatives.

The curvature formula for a tube and its derivation is described in detail in "Quantifying Gun Barrel Curvature: From Derivation of the Basic Formulas to Evaluating Derivatives, Estimating Errors, and Selecting Measurement Intervals" by David F. Finlayson, September 1993, 16 pages, available from the Defense Technical Information Center, Accession Number: ADP009078. This article by Finlayson is incorporated by reference herein.

Instruments to measure slope or angle of inclination are commercially available. These instruments are known as clinometers, inclinometers or goniometers and they may have resolutions better than 0.002 degree of arc. To attain this level of accuracy requires reference to an unvarying direction vector. The local vertical gravity vector is convenient, unvarying and reliable and is the reference of choice for clinometers.

Figure 1:
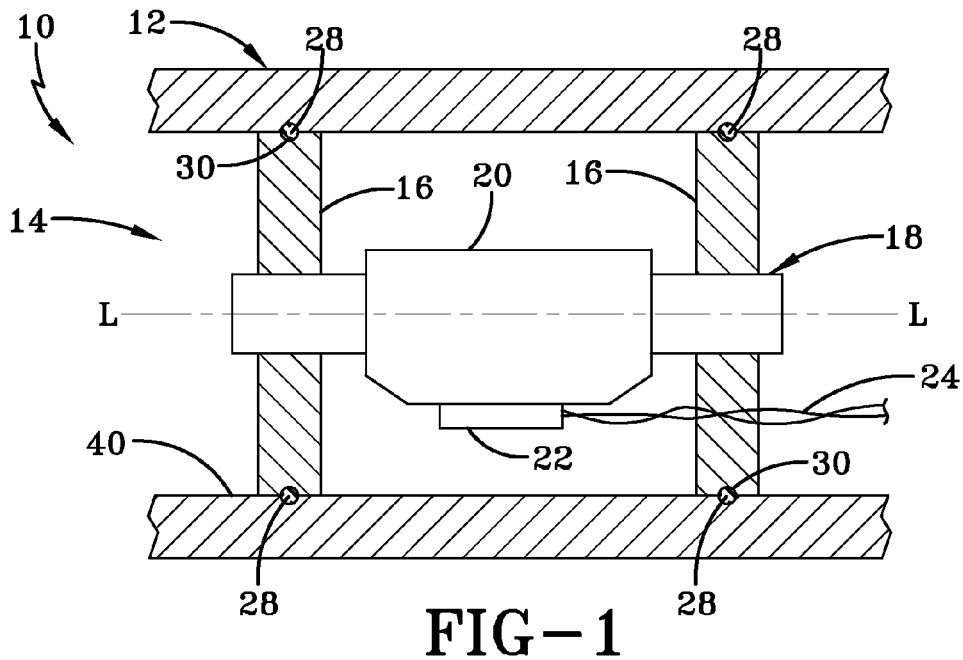
FIG. 1 is a side view, partially in section, of one embodiment of an apparatus for measuring angles of inclination of the centerline curve of a tube.

FIG. 1 is a side view, partially in section, of one embodiment of an apparatus 10 for measuring the angles of inclination of the centerline curve of a tube 12 having a bore 40. Apparatus 10 comprises a shuttle 14 that is movable axially (along the line L-L) inside the bore 40 of tube 12. Shuttle 14 comprises a pair of circular end plates 16 having a diameter that fits snuggly in the bore 40 of tube 12. End plates 16 may form, for example, a sliding fit with the bore 40 of the tube 12. The fit must be such that the end plates 16 can be moved axially inside the tube 12 without damage to the plates 16 or the interior of the tube 12.

To facilitate positioning of the shuttle 14 in the tube 12, end plates 16 may be provided with circumferential grooves 30 and elastic rings 28 disposed in the grooves 30. The elastic rings 28 provide a circumferential force against the wall of the tube 12 and function to stabilize and center the shuttle 14. A shaft 18 joins the end plates 16. The end plates 16 and shaft 18 may comprise, for example, aluminum.

A clinometer 22 is rotatably fixed to the shuttle 14. The clinometer 22 must be oriented so that it measures tilt in the vertical plane tangent to the tube centerline curve at the point of interest. The orientation of the clinometer 22 must be the same regardless of the rotation of the shuttle 14 inside of tube 12. Thus, the shaft 18 is gimbaled (rotatable) with respect to the end plates 16 or the carrier 20 may be gimbaled (rotatable) with respect to the shaft 18. In either embodiment, the clinometer 22 is fixed to the carrier 20. The distance between end plates 16, the "wheelbase," varies with the caliber of the gun tube 12. Typically, the wheelbase is about one to about one and a half times the caliber of the gun tube 12.

Figure 2:
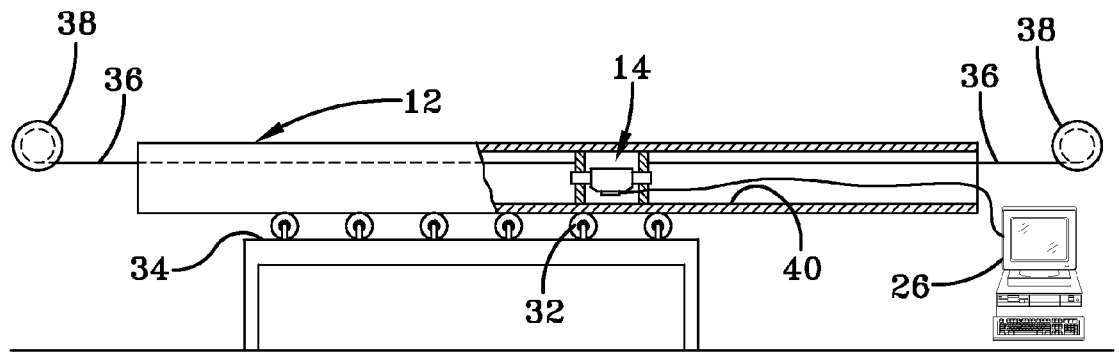
FIG. 2 is a schematic side view, partially cut away, of a tube in position for measurement.

FIG. 2 is a schematic side view, partially cut away, of a tube 12 in position for measurement. Tube 12 may be laid on rollers 32 supported by table 34. A computer 26 is connected to the clinometer 22 via a hard-wire connection 24 or, optionally, via a wireless connection. Computer 26 processes the measurements made by the clinometer 22. One or more cables or lines 36 are attached at one end to the shuttle 14 and at another end to a crank or winch 38. Winches 38 are used to move the shuttle 14 axially along the tube 12.

Figure 3:
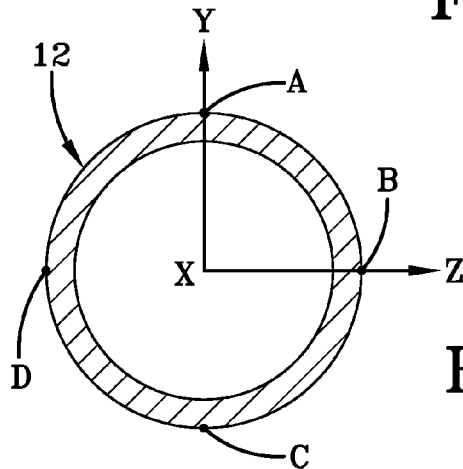
FIG. 3 is a cross-section of a tube.

The inventive method includes measuring the angles of inclination of the tangent to the centerline curve of the tube 12 at a plurality of axial locations along the tube. FIG. 3 is a sectional view of the tube 12 at axial location N showing the x, y, z coordinate system. The y and z axes are in the plane of the tube 12 cross-section and the x-axis extends axially along the length of the tube 12. At each axial location N, measurements of the angles of inclination of the tangent to the centerline curve are taken at four different rotational positions of the tube 12.

For example, in FIG. 3, a first measurement is taken with point A at the top of the tube. The next three measurements are taken at successive positions 90 degrees apart. That is, tube 12 is rotated so that point B is at the top of the tube and then a second measurement is taken. Tube 12 is then rotated so that point C is at the top of the tube and then a third measurement is taken. Tube 12 is then rotated so that point D is at the top of the tube and then the fourth measurement is taken.

Gravity causes the tube 12 to droop or sag. The effect of gravity may be eliminated by taking a 180 degree out of phase measurement, subtracting it from the 0 degree phase measurement and dividing the difference by two. Specifically, the measurement taken when point C is at the top is subtracted from the point A measurement and the difference is divided by two. The result is $\Theta_y$, an angle of inclination of the tangent to the centerline curve at section N, without the effect of gravity. Similarly, the measurement taken when point D is at the top is subtracted from the point C measurement and the difference is divided by two. The result is $\Theta_z$, an angle of inclination of the tangent to the centerline curve at section N, without the effect of gravity. These four measurements are taken at a plurality of axial locations N along the tube 12. A preferred axial interval for taking measurements is about two inches.

The slope of the centerline curve in the x-y plane at section N is dy/dx and the slope of the centerline curve in the x-z plane at section N is dz/dx. In the case of a two-dimensional curve, the slope is defined as tan $\Theta$, where $\Theta$ is the angle of inclination in the plane of the two-dimensional curve. Because the centerline curve of a gun tube is three-dimensional and because of the way the clinometer measures inclination angles, a more precise expression for dy/dx is $$\frac{\sin\Theta y}{\sqrt{1-\sin^2\Theta y - \sin^2\Theta z}}, \qquad \text{(Equation 1)}$$

and a more precise expression for dz/dx is $$\frac{\sin\Theta z}{\sqrt{1-\sin^2\Theta y - \sin^2\Theta z}}. \qquad \text{(Equaton 2)}$$

The measured values of $\Theta_y$ and $\Theta_z$ are substituted into Equations 1 and 2 to calculate the first order derivatives dy/dx and dz/dx at section N. The second (and higher order) derivatives at section N, $d^2y/dx^2$ and $d^2z/dx^2$, may be obtained from the first order derivatives by known techniques of numerical differentiation. The curvature of the centerline curve, $\kappa$, is the inverse of the radius of curvature $\rho$. The curvature $\kappa$ is given by $$\left\{ \frac{\left(\frac{dy}{dx}\frac{d^2z}{dx^2} - \frac{dz}{dx}\frac{d^2y}{dx^2}\right)^2 + \left(\frac{d^2z}{dx^2}\right)^2 + \left(\frac{d^2y}{dx^2}\right)^2}{\left[1 + \left(\frac{dy}{dx}\right)^2 + \left(\frac{dz}{dx}\right)^2\right]^3} \right\}^{1/2} \quad \text{(Equation 3)}$$

The curvature κ may be calculated using Equation 3 for each axial location N along the length of the tube 12. A known curve fitting process may then be used to create a mathematical expression for the curvature κ as a function of axial location N along the tube. The tangent vector, the principal normal vector and the binormal vector at each axial location N may also be determined from the derivatives (see "Quantifying Gun Barrel Curvature: From Derivation of the Basic Formulas to Evaluating Derivatives, Estimating Errors, and Selecting Measurement Intervals" by David F. Finlayson). One or more of the equation of curvature and the tangent, principal normal and binormal vectors may be used by the press operator when straightening the tube 12. This information may also provide the basis for further calculations and eventual automation of the tube straightening process.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An apparatus for measuring an angle of inclination of a tangent to a centerline curve of a tube, comprising:
    a shuttle; and
    a clinometer rotatably fixed to the shuttle.

2. The apparatus of claim 1 wherein the shuttle comprises a pair of circular end plates and a shaft that joins the end plates.

3. The apparatus of claim 2 wherein the shaft is rotatable with respect to the end plates.

4. The apparatus of claim 2 wherein the shuttle comprises a carrier attached to the shaft and the clinometer is fixed to the carrier.

5. The apparatus of claim 4 wherein the carrier is rotatable with respect to the shaft.

6. The apparatus of claim 1 further comprising a computer connected to the clinometer.

7. The apparatus of claim 1 further comprising a line attached to the shuttle.

8. The apparatus of claim 7 further comprising a winch attached to the line.

9. A method of determining curvature of a tube having a centerline curve, comprising:
    measuring angles of inclination of a tangent to the centerline curve at a plurality of axial locations along the tube.

10. The method of claim 9 wherein four angles of inclination of a tangent to the centerline curve are measured at each axial location.

11. The method of claim 10 wherein the four angles of inclination are measured at four tube positions that are about ninety degrees apart.

12. The method of claim 11 wherein the four angles of inclination comprise two pairs of angles of inclination, each pair comprising angles of inclination that are measured at tube locations that are 180 degrees apart.

13. The method of claim 12 wherein an angle of inclination that is corrected for gravity equals one-half of a difference between the pair of angles of inclination that are measured at tube locations that are 180 degrees apart.

14. The method of claim 13 wherein slopes of the centerline curve are defined by $$dy/dx = \frac{\sin\Theta y}{\sqrt{1 - \sin^2\Theta y - \sin^2\Theta z}} \text{ and } dz/dx = \frac{\sin\Theta z}{\sqrt{1 - \sin^2\Theta y - \sin^2\Theta z}},$$

where $\Theta_y$ and $\Theta_z$ are angles of inclination corrected for gravity.

15. The method of claim 14 wherein the slopes dy/dx and dz/dx are first order derivatives of the centerline curve of the tube, the method further comprising numerically differentiating dy/dx and dz/dx to obtain second order derivatives of the centerline curve of the tube.

16. The method of claim 15 further comprising calculating the curvature by substituting the first and second order derivatives into the expression:

$$\left\{ \frac{\left(\frac{dy}{dx}\frac{d^2z}{dx^2} - \frac{dz}{dx}\frac{d^2y}{dx^2}\right)^2 + \left(\frac{d^2z}{dx^2}\right)^2 + \left(\frac{d^2y}{dx^2}\right)^2}{\left[1 + \left(\frac{dy}{dx}\right)^2 + \left(\frac{dz}{dx}\right)^2\right]^3} \right\}^{1/2}.$$

17. The method of claim 16 further comprising creating a mathematical expression for the curvature of the tube.

* * * * *

UNITED STATES PATENT AND TRADEMARK OFFICE
CERTIFICATE OF CORRECTION

| | | |
|---|---|---|
| PATENT NO. | : 8,079,154 B1 | |
| APPLICATION NO. | : 11/690879 | |
| DATED | : December 20, 2011 | |
| INVENTOR(S) | : David F. Finlayson | |

It is certified that error appears in the above-identified patent and that said Letters Patent is hereby corrected as shown below:

On the Title Page, Item (73), "Navy" should read --Army--.

Signed and Sealed this
Third Day of September, 2013

Teresa Stanek Rea
*Acting Director of the United States Patent and Trademark Office*